United States Patent
Cho et al.

(10) Patent No.: US 10,685,613 B2
(45) Date of Patent: Jun. 16, 2020

(54) LIQUID CRYSTAL DISPLAY DEVICE, CONTROLLER THEREOF, AND DRIVING METHOD THEREOF

(71) Applicant: LG DISPLAY CO., LTD., Seoul (KR)

(72) Inventors: HwiJe Cho, Daegu (KR); SeungHun Han, Daegu (KR); Jewon Park, Busan (KR); ChulSang Shin, Gyeonggi-do (KR); JeongGeun Lee, Daegu (KR); JaeKwang Lee, Daegu (KR)

(73) Assignee: LG DISPLAY CO., LTD., Seoul (KR)

( * ) Notice: Subject to any disclaimer, the term of this patent is extended or adjusted under 35 U.S.C. 154(b) by 0 days.

(21) Appl. No.: 16/235,530

(22) Filed: Dec. 28, 2018

(65) Prior Publication Data

US 2019/0237031 A1    Aug. 1, 2019

(30) Foreign Application Priority Data

Jan. 26, 2018    (KR) .................. 10-2018-0010182

(51) Int. Cl.
*G09G 3/36* (2006.01)
*G02F 1/133* (2006.01)
*G02F 1/1362* (2006.01)

(52) U.S. Cl.
CPC ....... *G09G 3/3614* (2013.01); *G02F 1/13306* (2013.01); *G02F 1/136286* (2013.01); *G09G 3/3677* (2013.01); *G09G 3/3688* (2013.01); *G09G 2300/0426* (2013.01); *G09G 2310/08* (2013.01)

(58) Field of Classification Search
CPC .......... G02F 1/13306; G02F 1/136286; G09G 2300/0426; G09G 2310/08; G09G 2320/10; G09G 2340/0435; G09G 3/3614; G09G 3/3677; G09G 3/3688
See application file for complete search history.

(56) References Cited

U.S. PATENT DOCUMENTS

| | | | | |
|---|---|---|---|---|
| 2005/0258780 A1* | 11/2005 | Chen | ................ | G09G 3/3406 315/291 |
| 2008/0204613 A1* | 8/2008 | Kim | ................ | G02F 1/133707 349/33 |
| 2009/0185082 A1* | 7/2009 | Hashimoto | .......... | G09G 3/3614 348/739 |
| 2011/0248985 A1* | 10/2011 | Lin | .................. | G09G 3/3614 345/214 |

(Continued)

*Primary Examiner* — Dmitriy Bolotin
(74) *Attorney, Agent, or Firm* — Birch, Stewart, Kolasch & Birch, LLP

(57) ABSTRACT

A liquid crystal display (LCD) device, a controller thereof, and a driving method thereof are provided. The LCD device can include a liquid crystal display panel configured to display images, on which data lines and gate lines are disposed, and subpixels defined by the data lines and the gate lines are arranged; a gate driver configured to supply a scanning signal to the gate lines; a data driver configured to supply a data voltage to the data lines; and a controller configured to control the gate driver and the data driver, in which the LCD device operates in a first type of inversion when a driving frequency is in a first driving frequency range, and the LCD device operates in a second type of inversion different from the first type of inversion when the driving frequency is in a second driving frequency range different from the first driving frequency range.

17 Claims, 16 Drawing Sheets

(56) References Cited

U.S. PATENT DOCUMENTS

| | | | | |
|---|---|---|---|---|
| 2014/0362129 | A1* | 12/2014 | Tanaka | G09G 3/3406 345/690 |
| 2015/0206491 | A1* | 7/2015 | Cho | G09G 3/3614 345/96 |
| 2015/0310814 | A1* | 10/2015 | Umekida | H04N 21/4402 345/690 |
| 2016/0085122 | A1* | 3/2016 | Nishihara | G02F 1/134336 349/37 |
| 2018/0005591 | A1* | 1/2018 | Yoshiga | G09G 3/3607 |
| 2018/0061336 | A1* | 3/2018 | An | G09G 3/3614 |
| 2018/0292721 | A1* | 10/2018 | Li | G02F 1/136213 |

* cited by examiner

Nth Frame     N+1th Frame

Nth Frame → N+1th Frame

LIQUID CRYSTAL DISPLAY DEVICE, CONTROLLER THEREOF, AND DRIVING METHOD THEREOF

CROSS REFERENCE TO RELATED APPLICATION

This application claims the benefit of priority to Korean Patent Application No. 10-2018-0010182, filed in the Republic of Korea on Jan. 26, 2018, which is hereby incorporated by reference for all purposes as if fully set forth herein.

FIELD

The present disclosure relates to a liquid crystal display (LCD) device, a controller thereof, and a driving method thereof.

DESCRIPTION OF RELATED ART

In response to the development of information technology (IT), the market for display devices respectively serving as an interface between a user and information is increasing. Accordingly, the use of flat panel displays (FPD), such as liquid crystal display (LCD) devices, organic light-emitting diode (OLED) display devices, and plasma display panels (PDPs), is increasing. Among such display devices, LCD devices are in widespread use, due to the ability thereof to realize high resolution as well as the capability thereof for miniaturization and enlargement.

LCD devices drive LCD panels by an inversion method in order to prevent liquid crystal from degrading and to improve display quality.

For example, LCD devices may use various types of inversion method, such as frame inversion, line inversion, column inversion, and dot inversion.

In general, LCD devices are operated by a single inversion method in which a single type of inversion is used. In this situation, when an operating environment is switched between a low-speed operating environment, such as displaying a low-rate video or a still image, and a high-speed operating environment, such as displaying a game, it is disadvantageously difficult to maintain high image quality by the single inversion method, even if a driving frequency is changed.

In addition, respective inversion methods may cause crosstalk, depending on a driving frequency, as well as image defects, such as a horizontal line due to a vertical luminance difference, or the like.

BRIEF SUMMARY

Various aspects of the present disclosure provide a liquid crystal display (LCD) device, a controller thereof, and a driving method thereof that can select, or be switched to, a type (or mode, hereinafter, referred to as "type" and including mode) of inversion suitable for a specific driving frequency depending on the driving environment, thereby preventing image defects and maintaining superior image quality.

According to an embodiment of the present disclosure, an LCD device includes: an LCD panel configured to display images, on which a plurality of data lines and a plurality of gate lines are disposed, and a plurality of subpixels defined by the plurality of data lines and the plurality of gate lines are arranged; a gate driver (or a gate drive/driving circuit, hereinafter, referred to as "gate driver") supplying a scanning signal to the plurality of gate lines; a data driver (or a data drive/driving circuit, hereinafter, referred to as "data driver") supplying a data voltage to the plurality of data lines; and a controller configured to control the gate driver and the data driver.

The LCD device can operate in a first type of inversion when a driving frequency is in a first driving frequency range and operate in a second type of inversion different from the first type of inversion when the driving frequency is in a second driving frequency range different from the first driving frequency range.

According to another embodiment of the present disclosure, a controller includes: a frequency checking section configured to check the driving frequency; and an inversion controller configured to output a polarity control signal corresponding to one of a first type of inversion and a second type of inversion depending on a result of checking the driving frequency.

The inversion controller can output a first polarity control signal corresponding to the first type of inversion when the driving frequency is included in the first driving frequency range according to the result of checking the driving frequency and output a second polarity control signal corresponding to the second type of inversion when the driving frequency is included in the second driving frequency range according to the result of checking the driving frequency.

According to a further embodiment of the present disclosure, a method of driving an LCD device includes checking a driving frequency; and outputting a polarity control signal corresponding to one of a first type of inversion and a second type of inversion depending on a result of checking of the driving frequency.

The outputting of the polarity control signal can include outputting a first polarity control signal corresponding to the first type of inversion when the driving frequency is in a first driving frequency range and outputting a second polarity control signal corresponding to the second type of inversion different from the first type of inversion when the driving frequency is in a second driving frequency range.

When the LCD device, the controller thereof, and the driving method thereof according to example embodiments are applied, it is possible to select, or be switched to, a type of inversion that is better suited for a specific driving frequency depending on the driving environment, thereby preventing image defects and maintaining superior image quality.

BRIEF DESCRIPTION OF THE DRAWINGS

The above and other objects, features, and advantages of the present disclosure will be more clearly understood from the following detailed description when taken in conjunction with the accompanying drawings, in which.

DETAILED DESCRIPTION OF THE EMBODIMENTS

Figure 1:
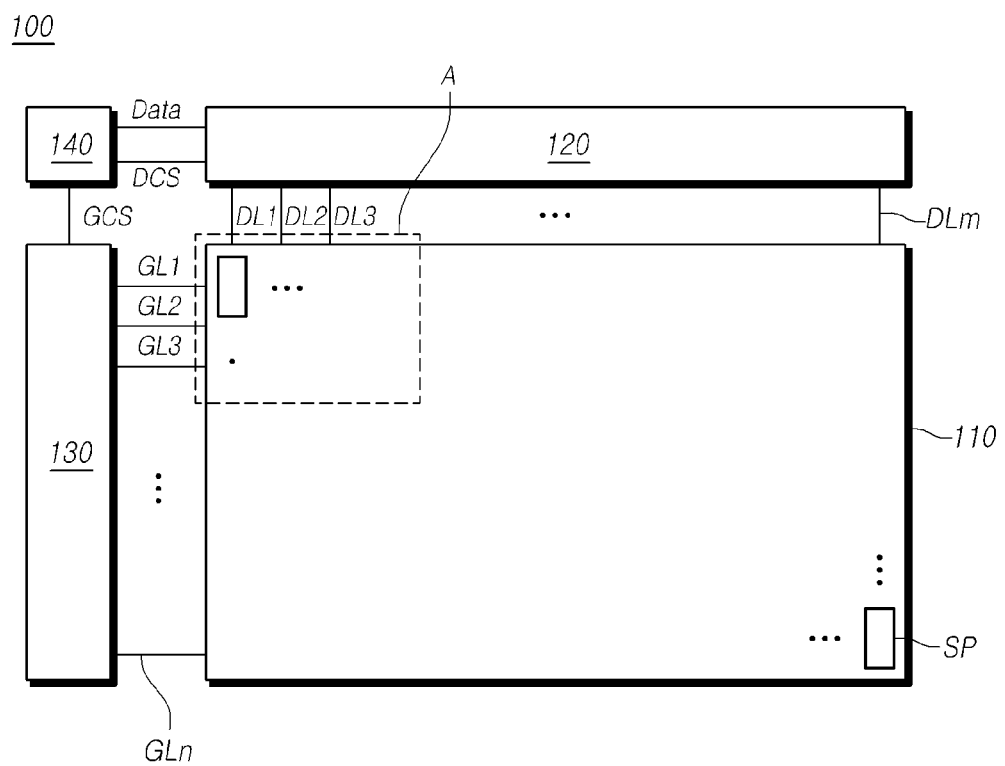
FIG. 1 is a system configuration diagram illustrating a liquid crystal display (LCD) device according to an example embodiment.

Hereinafter, reference will be made to embodiments of the present disclosure in detail, examples of which are illustrated in the accompanying drawings. Throughout this document, reference should be made to the drawings, in which the same reference numerals and symbols will be used to designate the same or like components. In the following description of the present disclosure, detailed descriptions of known functions and components incorporated herein will be omitted in the situation that the subject matter of the present disclosure may be rendered unclear thereby.

It will also be understood that, while terms, such as "first," "second," "A," "B," "(a)," and "(b)," may be used herein to describe various elements, such terms are merely used to distinguish one element from other elements. The substance, sequence, order, or number of such elements is not limited by these terms. It will be understood that when an element is referred to as being "connected to" or "coupled to" another element, not only can it be "directly connected or coupled to" the other element, but it can also be "indirectly connected or coupled to" the other element via an "intervening" element. In the same context, it will be understood that when an element is referred to as being formed "on" or "under" another element, not only can it be directly located on or under another element, but it can also be indirectly located on or under another element via an intervening element.

FIG. 1 is a system configuration diagram illustrating a liquid crystal display (LCD) device according to an example embodiment.

Referring to FIG. 1, the LCD device 100 according to the example embodiment includes: an LCD panel 110 displaying images, on which a plurality of data lines DL and a plurality of gate lines GL are disposed, and a plurality of subpixels SP defined by the plurality of data lines DL and the plurality of gate lines GL are arranged; a data driver 120 driving the plurality of data lines DL; a gate driver 130 driving the plurality of gate lines GL; and a controller 140 controlling the data driver 120 and the gate driver 130.

The controller 140 (e.g., a timing controller) controls the data driver 120 and the gate driver 130 by supplying a variety of control signals DCS and GCS to the data driver 120 and the gate driver 130.

The controller 140 can convert image data, input from an external source, into a data signal format used by the data driver 120, and output the converted image data Data. For example, the controller 140 may supply the image data Data, converted according to the resolution of the LCD panel 110 or a subpixel structure, to the data driver 120.

In addition, the controller 140 outputs a variety of data control signals DCS, including a source start pulse (SSP), a source sampling clock (SSC), a source output enable (SOE) signal, and a polarity control (POL) signal, to control the data driver 120.

The polarity control signal is a signal by which the polarity of data voltages sequentially output from output channels of the data driver 120 are controlled. For example, the polarity control signal can be inverted in the unit of one frame period, in response to column inversion, or the polarity control signal can be inverted in the unit of N horizontal periods, in response to vertical N-dot inversion The controller 140 can be a timing controller used in a display device, or can be a control unit including a timing controller and other parts performing other control functions. The controller 140 can be provided as a component separate from the data driver 120, or can be provided as an integrated circuit (IC) integrated with the data driver 120.

The data driver 120 receives image data Data from the controller 140 and supplies data voltages to the plurality of data lines DL, thereby driving the plurality of data lines DL. The data driver 120 is also referred to as a source driving circuit.

The gate driver 130 sequentially drives the plurality of gate lines GL by sequentially supplying a scanning signal to the plurality of gate lines GL. The gate driver 130 is also referred to as a scanning driving circuit.

Figure 2:
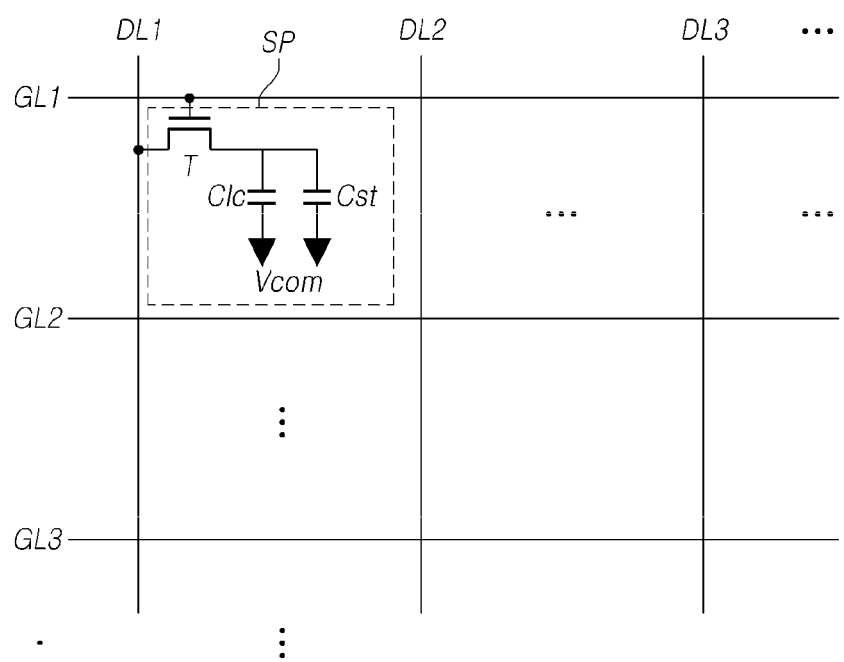
FIG. 2 is an enlarged schematic diagram illustrating area A in FIG. 1.

FIG. 2 is an enlarged schematic diagram illustrating area A in FIG. 1.

Referring to FIG. 2, regarding subpixels SP arranged in the LCD panel 110, the type and number of circuit elements of each of the subpixels SP can be determined variously, depending on functions to be provided, design, and the like. A predetermined number of subpixels SP can be grouped as a single unit to provide a single pixel P.

A gate line GL and a data line DL are connected to each of the subpixels SP of the LCD panel 110. The subpixel SP is provided with a thin-film transistor T located between the gate line GL and the data line DL and a liquid crystal cell Clc connected to the thin-film transistor T.

The thin-film transistors T deliver data voltages of the data lines DL1 to DLm to the liquid crystal cells Clc, in response to gate high voltage signals Vgh of the gate lines GL1 to GLn.

Each of the liquid crystal cells Clc is comprised of a common electrode and a pixel electrode disposed on both sides of a liquid crystal layer to face each other, the pixel electrode being connected to the thin-film transistor T. Thus, the liquid crystal cell Clc can be equivalently expressed as a liquid crystal capacitor. The liquid crystal cell Clc includes a storage capacitor Cst to maintain a data voltage charged in the liquid crystal capacitor until the next voltage is charged. A common voltage Vcom is applied to the common electrode, and a data voltage is applied to the pixel electrode. A positive (+) voltage and a negative (−) voltage are applied to the pixel electrode as the data voltage, so that the polarity of the liquid crystal cell Clc is inverted.

The gate driver 130 turns the thin-film transistors T on by supplying a gate signal to the gate lines GL, so that the thin-film transistors T can be connected to the subpixels SP. In addition, data voltages output by the data driver 120 are applied to the subpixels SP connected to the data lines DL, so that an image is displayed.

The LCD panel 110 includes an array substrate including the thin-film transistors, an upper substrate provided with, for example, color filters and/or black matrices, and a liquid crystal layer situated between the array substrate and upper substrate.

A polarizer plate is attached to each of the upper substrate and the array substrate, and alignment layers for setting pre-tilt angles of liquid crystal molecules are provided. The common electrode is provided on the upper substrate in a vertical electric field driving method, such as a twisted nematic (TN) mode or a vertical alignment (VA) mode, and is provided on the array substrate in a horizontal electric field driving method, such as an in-plane switching (IPS) mode or a fringe field switching (FFS) mode. The liquid crystal mode of the LCD panel 110 can be implemented as any liquid crystal mode, as well as any of the above-stated TN mode, VA mode, IPS mode, and FFS mode.

In the above-described liquid crystal display method, the alignment of the liquid crystal layer is adjusted by the electric field applied between the pixel electrode and the common electrode provided in the subpixel, thereby adjusting the transmission of light, so that an image can be displayed.

The LCD device 100 can be implemented as any structure, such as a transmissive LCD device, a transflective LCD device, and a reflective LCD device. A backlight unit can be implemented as a direct backlight unit or an edge-type backlight unit.

As described above, the LCD device 100 drives the LCD panel by an inversion method in order to prevent liquid crystal from degrading and to improve display quality.

Although superior quality is maintained in a specific driving frequency by a single inversion method, when the single inversion method is directly applied to other driving frequencies different from the specific driving frequency, luminance for maintaining quality may not be satisfied and image defects, such as a horizontal line defect and vertical crosstalk, may occur.

That is, when an operating environment is switched between a low-speed operating environment, such as displaying a low-rate video or a still image, and a high-speed operating environment, such as displaying a game (e.g., a low-latency video game), it may not be possible to maintain high image quality by a single inversion method.

To overcome these problems, the LCD device 100 can operate in a first type of inversion when the driving frequency is included in a first driving frequency range and operate in a second type of inversion, different from the first type of inversion, when the driving frequency is included in a second driving frequency range, different from the first driving frequency range.

The controller 140 outputs a first data control signal DCS, corresponding to the first type of inversion, when the driving frequency is included in the first driving frequency range and outputs a second data control signal DCS, corresponding to the second type of inversion, different from the first type of inversion, when the driving frequency is included in the second driving frequency range.

Here, the driving frequency included in the first driving frequency range can be lower than the driving frequency included in the second driving frequency range. In a specific frame, the second type of inversion can have a smaller number of polarity alternations than the first type of inversion.

As described above, the LCD device 100 can select, or switch to, a type of inversion method suitable for a specific driving frequency depending on the driving environment, thereby preventing image defects and maintaining high image quality.

Figure 3:
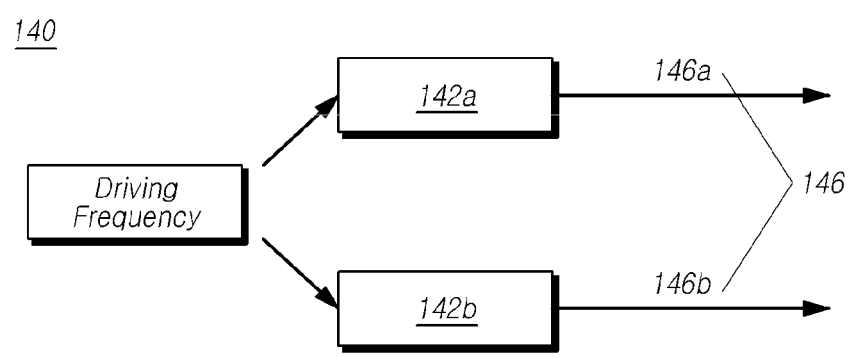
FIG. 3 is a diagram illustrating portions of the operation of the controller of the LCD device illustrated in FIG. 1.

FIG. 3 is a diagram illustrating portions of the operation of the controller of the LCD device 100 illustrated in FIG. 1.

Referring to FIGS. 1 and 3, the LCD device 100 according to the example embodiment can operate in a first type of inversion when the driving frequency is in a first driving frequency range 142a and operate in a second type of inversion different from the first type of inversion when the driving frequency is in a second driving frequency range 142b different from the first driving frequency range 142a.

When the driving frequency is in one of the driving frequency ranges 142a and 142b, the controller 140 outputs a polarity control signal 146 corresponding to a type of inversion of the driving frequency range. The polarity control signal 146 can be included in the data control signal DCS.

The data driver 120 causes the polarity of data voltages sequentially output from the channels thereof to be inverted, in response to the polarity control signal 146 corresponding to a specific type of inversion included in the data control signal DCS.

For example, when the driving frequency is included in the first driving frequency range 142a, the controller 140 outputs the first polarity control signal 146a corresponding to the first type of inversion. When the driving frequency is included in the second driving frequency range 142b, the controller 140 outputs the second polarity control signal 146b corresponding to the second type of inversion different from the first type of inversion.

The controller 140 of the LCD device 100 can calculate the driving frequency by receiving a variety of timing signals from an external system, as will be described later, or receive the driving frequency calculated in the LCD device 100.

The first and second driving frequency ranges 142a and 142b can vary depending on the types of image signals entering from an external source, for example, a low-speed operating environment or a high-speed operating environment. For example, the first driving frequency range 142a can include a driving frequency corresponding to an image signal used in the low-speed operating environment, such as a low-rate video or a still image, while the second driving frequency range 142b can include a driving frequency corresponding to an image signal used in the high-speed operating environment, such as a video game.

The driving frequency included in the first driving frequency range 142a can be lower than the driving frequency included in the second driving frequency range 142b. For example, the first driving frequency range can be from 48 Hz to 120 Hz, while the second driving frequency range can be from 120 Hz to 144 Hz. However, the first and second driving frequency ranges according to the present disclosure are not limited thereto.

Each of the first type of inversion and the second type of inversion can be one of frame inversion, line inversion, column inversion, Z-inversion, and dot inversion.

Frame inversion is performed by inverting the polarities of data voltages supplied to the subpixels (or pixels) on the LCD panel 110 in every frame period. Line inversion is performed by alternatingly inverting the polarities of data voltages supplied to the subpixels (or pixels) on the LCD panel 110 not only according to the gate lines GL but also according to the frames. Column inversion is performed by alternatingly inverting the polarities of data voltages supplied to the subpixels (or pixels) on the LCD panel 110 according to not only the data lines DL but also according to the frames. In the situation of Z-inversion, thin-film transistors T and pixel electrodes connected to the Nth gate line are arranged to the right (or left) of the data lines, and thin-film transistors T and pixel electrodes connected to the next gate line, e.g., the (N+1)th gate line, are arranged to the left (or right) of the data lines. Here, data voltages are supplied to the data lines by column inversion, so that polarity inversion is the same as that of 1-dot inversion.

Dot inversion is performed by alternatingly inverting the polarities of data voltages supplied to the subpixels (or pixels) on the LCD panel 110 according to the gate lines GL and the data lines DL, as well as according to the frames. Dot inversion can include N-dot inversion, such as 1-dot inversion, vertical 2-dot inversion, and horizontal 2-dot inversion.

In an example, the first type of inversion can be dot inversion, while the second type of inversion can be one of line inversion, column inversion, and frame inversion, each of which has a smaller number of polarity alternations than the first type of inversion.

In another example, the first type of inversion can be line inversion or column inversion, while the second type of inversion can be frame inversion having a smaller number of polarity alternations than the first type of inversion.

As described above, the driving frequency included in the first driving frequency range 142a can be lower than the driving frequency included in the second driving frequency range 142b. In this instance, the first type of inversion can be dot inversion, while the second type of inversion can be column inversion or Z inversion. For example, the first type of inversion can be vertical 2-dot inversion, while the second type of inversion can be column inversion or Z inversion. Due to this feature, the LCD device 100 can consequently prevent image defects, thereby optimizing superior image quality.

Figure 4:
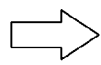
FIG. 4 is a schematic diagram illustrating vertical 2-dot inversion.

FIG. 4 is a schematic diagram illustrating vertical 2-dot inversion.

Referring to FIG. 4, in the situation in which the first type of inversion is referred to vertical 2-dot inversion, when the driving frequency is included in the first driving frequency range 142a, the controller 140 outputs a polarity control signal corresponding to vertical 2-dot inversion to the data driver 120. Due to the polarity control signal corresponding to vertical 2-dot inversion, the polarities of the data voltages are controlled to be inverted in the unit of every frame and two horizontal periods.

As illustrated in FIG. 4, vertical 2-dot inversion refers to an inversion type in which the polarities of data voltages are alternatingly inverted in the unit of one dot in the horizontal direction as in the situation of 1-dot inversion and are inverted in the unit of two dots in the vertical direction.

Figure 5:
FIG. 5 is a schematic diagram illustrating column inversion.

FIG. 5 is a schematic diagram illustrating column inversion.

Referring to FIG. 5, in the situation in which the second type of inversion is column inversion, when the driving frequency is included in the second driving frequency range 142b, the controller 140 outputs a polarity control signal corresponding to column inversion to the data driver 120. Due to the polarity control signal corresponding to column inversion, the polarities of the data voltages are controlled to be inverted in the unit of odd data lines and in the unit of even data lines.

As illustrated in FIG. 5, column inversion refers to an inversion type in which the polarities of the data voltages to be supplied to the subpixels SP on the LCD panel 110 are alternatingly inverted according to the data lines and are inverted according to the frames.

Figure 6:
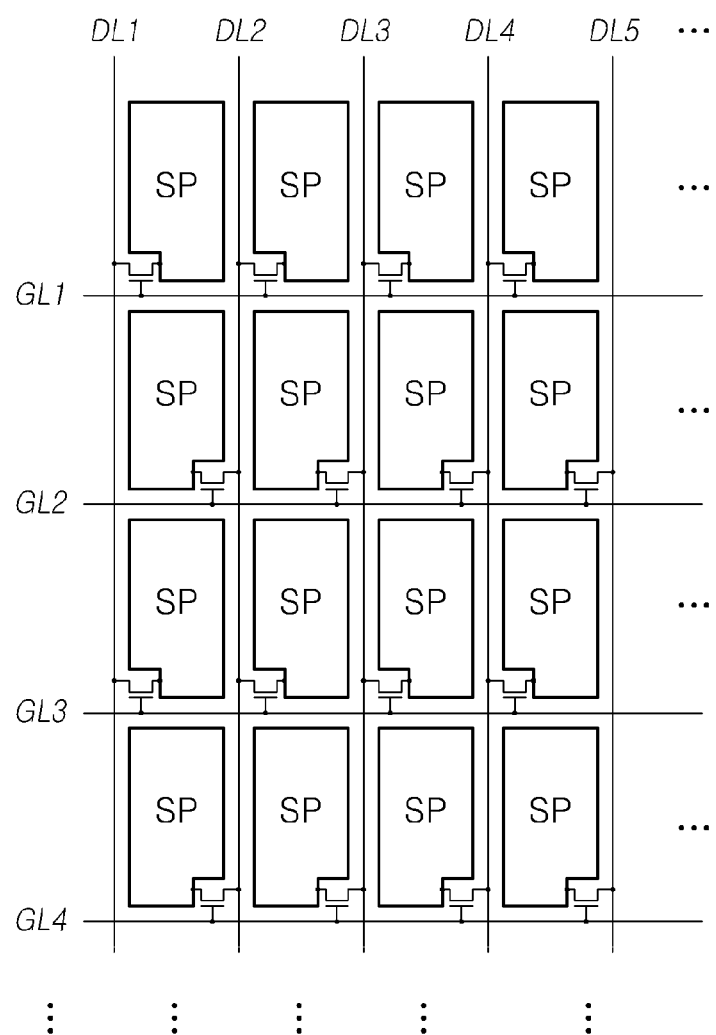
FIGS. 6 and 7 are schematic diagrams illustrating a Z inversion structure.
Figure 7:
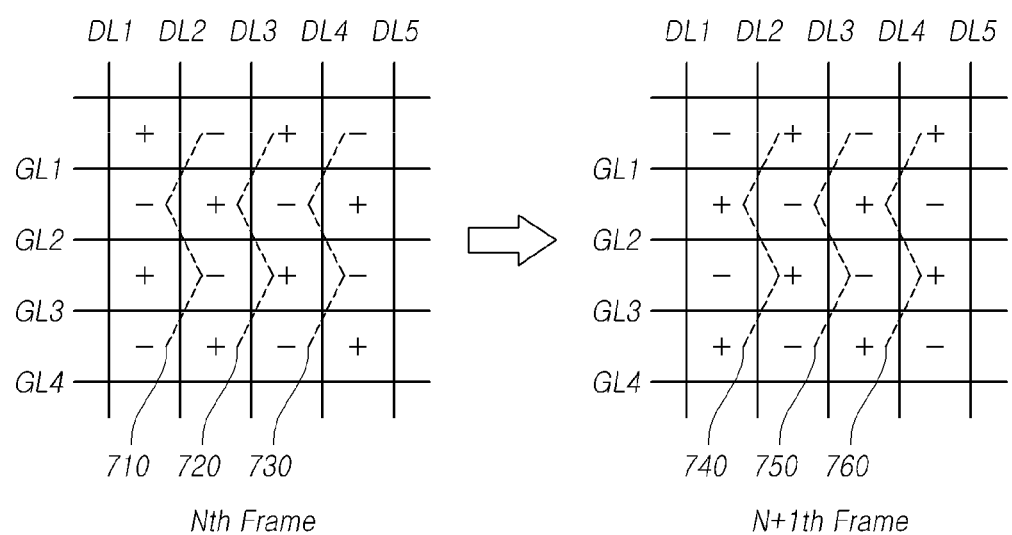

FIGS. 6 and 7 are schematic diagrams illustrating a Z inversion structure.

Referring to FIG. 6, according to the Z inversion structure, thin-film transistors T and pixel electrodes connected to the Nth gate line are arranged to the right (or left) of the data lines, and thin-film transistors T and pixel electrodes connected to the next gate line, e.g., the (N+1)th gate line, are arranged to the left (or right) of the data lines. The data lines supply data voltages by column inversion. That is, Z inversion corresponds to an improvement of column inversion.

For example, when the gates of the thin-film transistors T are connected to the first gate line GL1, the thin-film transistors T and the pixel electrodes are arranged to the right of the data lines DL1, DL2, DL3, and DL4. When the gates of the thin-film transistors T are connected to the second gate line GL2, the thin-film transistors T and the pixel electrodes are arranged to the left of the data lines DL2, DL3, DL4, and DL5. In the situation of the third gate line GL3, the thin-film transistors T and the pixel electrodes are arranged in the same structure as in the situation of the first gate line GL1. In the situation of the fourth gate line GL4, the thin-film transistors T and the pixel electrodes are arranged in the same structure as in the situation of the second gate line GL2. As described above, the thin-film transistors and the pixel electrodes are alternatingly arranged to the right or left of the data lines for every gate line.

Although Z inversion is performed by supplying the data voltages to the data lines DL by column inversion, the polarities of the data voltages are alternated for every gate line, data line, and frame, in the same manner as in 1-dot inversion, as illustrated in FIG. 7.

For example, in the Nth frame, a positive (+) data voltage is supplied to specific data lines DL1, DL3, and DL5, and a negative (−) data voltage is supplied to the remaining data lines DL2 and DL4. In this instance, the polarities of the subpixels indicated by a second dotted line 720 are positive (+), since the thin-film transistors T and the pixel electrodes of the indicated subpixels are connected to the third data line DL3 through which the positive (+) data voltage is supplied. In contrast, the polarities of the subpixels indicated by a first dotted line 710 and a third dotted line 730 are negative (−), since the thin-film transistors T and the pixel electrodes of the indicated subpixels are connected to the second data line DL2 and the fourth data line DL4 through which the negative (−) data voltage is supplied. Under the same principle, in the (N+1)th frame, a negative (−) data voltage is supplied to the data lines DL1, DL3, and DL5, and a positive (+) data voltage is supplied to the remaining data lines DL2 and DL4. In this instance, the polarities of the subpixels indicated by a fifth dotted line 750 are negative (−), since the thin-film transistors T and the pixel electrodes of the indicated subpixels are connected to the third data line DL3 through which the negative (−) data voltage is supplied. Likewise, the polarities of the subpixels indicated by a fourth dotted line 740 and a sixth dotted line 760 are positive (+), since the thin-film transistors T and the pixel electrodes of the indicated subpixels are connected to the second data line DL2 and the fourth data line DL4 through which the positive (+) data voltage is supplied.

In the situation in which the second type of inversion is Z inversion, when the driving frequency is included in the second driving frequency range 142b, the controller 140 outputs a polarity control signal corresponding to Z inversion to the data driver 120. The polarity control signal corresponding to Z inversion controls the polarities of data voltages to be inverted in the unit of every frame, every odd data line, and every even data line.

The driving frequency included in the first driving frequency range 142a can be lower than the driving frequency included in the second driving frequency range 142b.

In the LCD device 100 operating in a specific inversion method, with increases in the driving frequency, the charge rate of data voltage applied to the liquid crystal cells may be less than or equal to than a predetermined level, so that a suitable luminance level may not be provided.

The charge rate of data voltage applied to the liquid crystal cells tends to decrease as the driving frequency increases, although there are insignificant differences depending on the manufacturing process. In a region in which the driving frequency is greater than or equal to a specific frequency, the charge rate of data voltage does not satisfy a predetermined level. The driving frequency acting as a boundary point (or threshold) can differ depending on the system or product environment.

As will be described hereinafter, the first driving frequency range 142a and the second driving frequency range 142b can be set differently depending on the characteristics of the manufacturing process, even in the situation that the first driving frequency range 142a and the second driving frequency range 142b are used in the same LCD panel 110.

Figure 8:
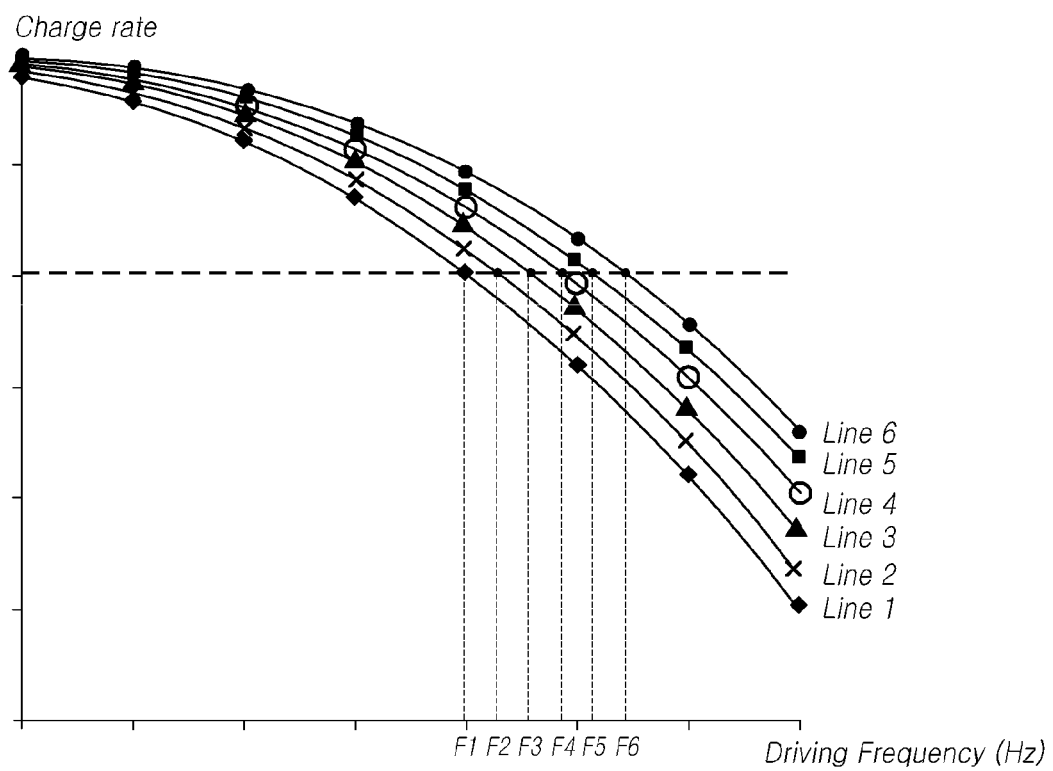
FIG. 8 is a graph illustrating variations in the charge rate of data voltage applied to liquid crystal cells of LCD devices operating in vertical N-dot inversion.

FIG. 8 is a graph illustrating variations in the charge rate of data voltages applied to liquid crystal cells of LCD devices operating in vertical N-dot inversion.

Referring to FIG. 8, in the LCD device 100 operating in vertical N-dot inversion, the charge rate of data voltage gradually decreases as the driving frequency increases. As illustrated in FIG. 8, it can be appreciated that LCD devices (indicated by Line 1 to Line 6), designed to have specific values by varying a passivation layer (PAS), a gate high voltage signal (Vgh), and the like, have different driving frequency thresholds F1 to F6 corresponding to a predetermined level (dotted line) of the charge rate of data voltage.

When the LCD device 100 operating in vertical N-dot inversion is driven at a driving frequency higher than the driving frequency threshold (F1 to F6), there is a difference between a data voltage applied to the liquid crystal cells in the odd gate lines and a data voltage applied to the liquid crystal cells in the even gate lines. Such a difference in the data voltage can cause a luminance difference, so that image defects, such as a horizontal line defect, can occur. This is because the characteristic of charge of data voltage of each odd gate line differs from the characteristic of charge of data voltage of the adjacent even gate line, to which a data voltage having the same polarity is supplied, and the charge rate decreases as the driving frequency increases.

Figure 9:
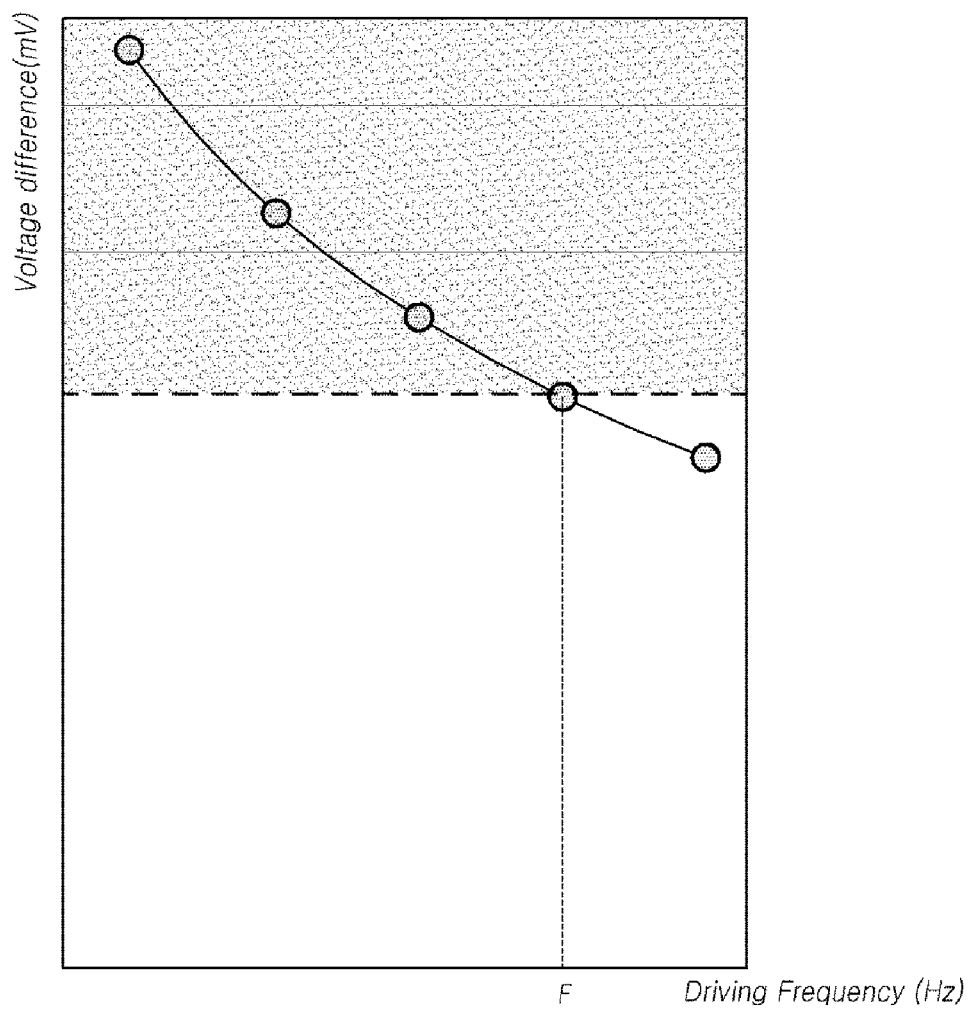
FIG. 9 is a graph illustrating voltages having an image defect pattern according to driving frequencies in an LCD device operating in column inversion.

FIG. 9 is a graph illustrating voltages having an image defect pattern according to driving frequencies in an LCD device operating in column inversion.

Referring to FIG. 9, when the LCD device 100 operates in column inversion, a single data line DL applies a data voltage having the same polarity, substantially no luminance difference occurs among adjacent gate lines GL. Accordingly, a luminance difference-induced image defect, for example, a horizontal line defect, may not occur.

However, the polarity of the single data line DL remains the same for a single frame. In addition, a positive (+) or negative (−) voltage difference is caused by a parasitic capacitor formed between the data line DL and an adjacent pixel electrode, and exists for the single frame, thereby causing an image defect, such as vertical crosstalk.

This problem is more significant with decreases in the driving frequency, since the capacity of the parasitic capacitor increases as the driving frequency decreases. As illustrated in FIG. 9, the voltage difference mV occurring between the data line DL and the adjacent pixel electrode, in the LCD device 100 operating in an inversion type different from the above-described inversion type, can be measured in order to identify vertical crosstalk. In FIG. 9, a dark area is a portion in which a gray pattern occurs. Referring to FIG. 9, it can be appreciated that the voltage difference occurring between the data line DL and the adjacent pixel electrode increases as the driving frequency decreases, and that vertical crosstalk having the gray pattern occurs in a range in which the voltage difference is equal to or greater than a specific voltage difference (mV) corresponding to a driving frequency threshold F.

The same is applied to Z inversion, e.g., an improved structure of column inversion, illustrated in FIGS. 6 and 7.

Accordingly, when the LCD device 100 operates in column inversion as illustrated in FIG. 9, the driving frequency of the LCD device 100 should be higher than the driving frequency threshold F to prevent vertical crosstalk due to increases in the voltage difference between the data line DL and the adjacent pixel electrode.

Referring to FIGS. 8 and 9 together, when the LCD device 100 operates in dot inversion as the first type of inversion and in column inversion or Z inversion as the second type of inversion, the driving frequency included in the first driving frequency range should be lower than the threshold of the driving frequency to prevent an image defect, such as a horizontal line defect, and the driving frequency included in the second driving frequency range should be higher than the threshold of the driving frequency to prevent an image defect, such as vertical crosstalk, as illustrated in FIG. 8.

Accordingly, the LCD device 100 should be controlled differently according to driving frequency ranges, so that the inversion type thereof corresponds to a specific driving frequency range. In addition, as described above, the first driving frequency range 142a and the second driving frequency range 142b can be set differently depending on the characteristics of the manufacturing process, even in the situation that the first driving frequency range 142a and the second driving frequency range 142b are used in the same LCD panel 110. For example, the first driving frequency range 142a and the second driving frequency range 142b can be set differently depending on characteristics of the manufacturing process, such as a passivation layer and a gate high voltage.

Figure 10:
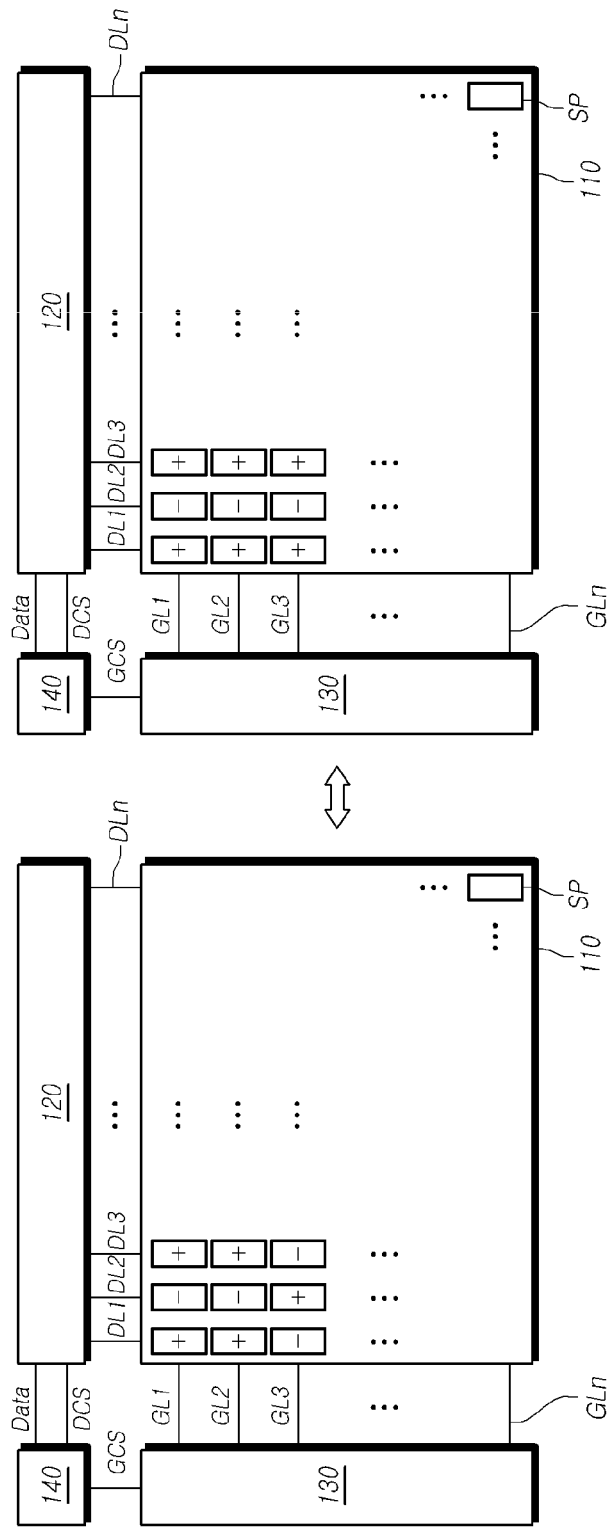
FIG. 10 is a schematic diagram illustrating an LCD device according to another example embodiment, the driving method of which is switched in response to variation in the driving frequency.

FIG. 10 is a schematic diagram illustrating an LCD device according to another example embodiment, the driving method of which is switched in response to variation in the driving frequency.

Referring to FIG. 10, the controller 140 controls the LCD device 100 to operate in the first type of inversion, e.g., vertical 2-dot inversion, with respect to the driving frequency included in the first driving frequency range 142a, in the low-speed operating environment. When the driving frequency is changed by an external system, the controller 140 controls the gate driver 130 and the data driver 120 by outputting a gate control signal GCS and a data control signal DCS, including a polarity control signal 146. Consequently, the operation of the LCD device is switched from the first type of inversion, e.g., vertical 2-dot inversion, to the second type of inversion, e.g., column inversion.

In contrast, the controller 140 controls the LCD device 100 to operate in the second type of inversion, e.g., column inversion, with respect to the driving frequency included in the second driving frequency range 142*b*, in the high-speed operating environment. When the driving frequency is changed by the external system, the controller 140 controls the gate driver 130 and the data driver 120 by outputting a gate control signal GCS and a data control signal DCS, including a polarity control signal. Consequently, the operation of the LCD device is switched from the second type of inversion, e.g., column inversion, to the first type of inversion, e.g., vertical 2-dot inversion.

Although vertical 2-dot inversion and column inversion have been described herein as examples of the inversion method, the present disclosure is not limited thereto.

Figure 11:
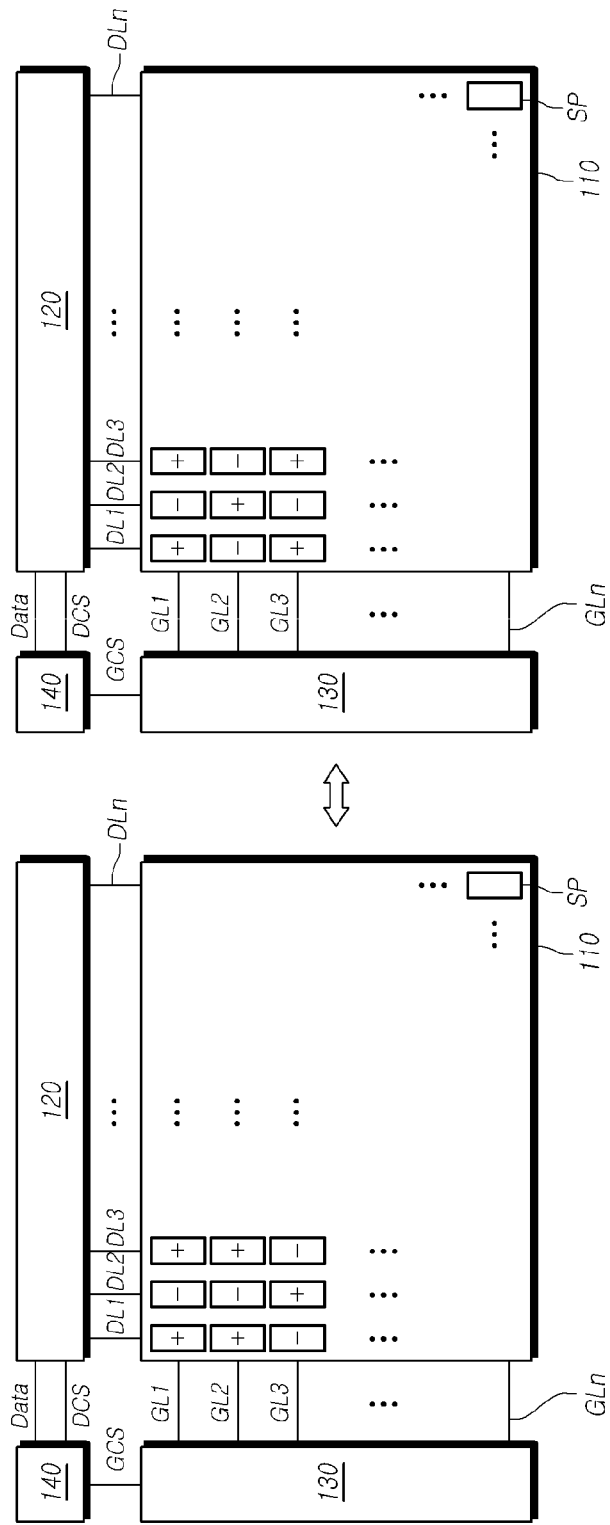
FIG. 11 is a schematic diagram illustrating an LCD device according to a further embodiment, the driving method of which is switched in response to variation in the driving frequency.

FIG. 11 is a schematic diagram illustrating an LCD device according to another example embodiment, the driving method of which is switched in response to variation or a change in the driving frequency.

Referring to FIG. 11, the controller 140 controls the LCD device 100 to operate in the first type of inversion, e.g., vertical 2-dot inversion, with respect to the driving frequency included in the first driving frequency range 142*a*, in the low-speed operating environment. When the driving frequency is changed by an external system, the controller 140 controls the gate driver 130 and the data driver 120 by outputting a gate control signal GCS and a data control signal DCS, including a polarity control signal 146. Consequently, the operation of the LCD device is switched from the first type of inversion, e.g., vertical 2-dot inversion, to the second type of inversion, e.g., Z inversion.

In contrast, the controller 140 controls the LCD device 100 to operate in the second type of inversion, e.g., Z inversion, with respect to the driving frequency included in the second driving frequency range 142*b*, in the high-speed operating environment (e.g., game mode). When the driving frequency is changed by the external system, the controller 140 controls the gate driver 130 and the data driver 120 by outputting a gate control signal GCS and a data control signal DCS, including a polarity control signal. Consequently, the operation of the LCD device is switched from the second type of inversion, e.g., Z inversion, to the first type of inversion, e.g., vertical 2-dot inversion.

Although vertical 2-dot inversion and Z inversion have been described herein as examples of the inversion method, the present disclosure is not limited thereto.

Figure 12:
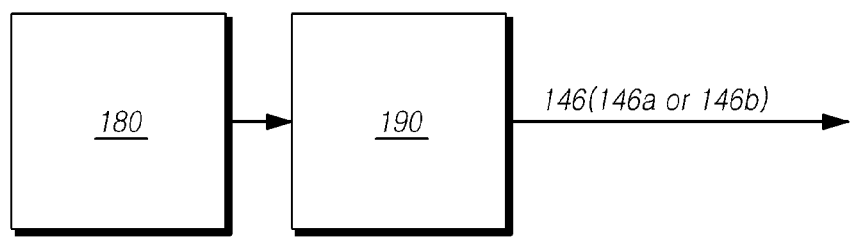
FIGS. 12 and 13 are schematic block diagrams illustrating controllers according to further example embodiments.
Figure 13:
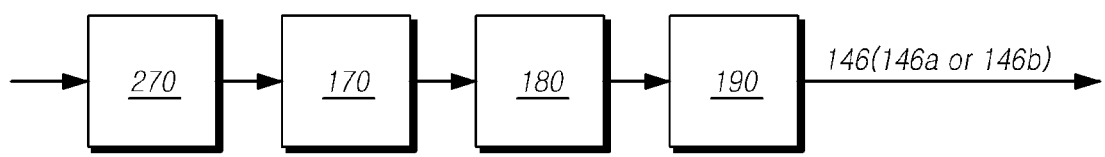

FIGS. 12 and 13 are schematic block diagrams illustrating controllers according to further example embodiments.

Referring to FIGS. 3 and 12, the controller according to an example embodiment includes a frequency checking section 180 or frequency checker for checking a driving frequency and an inversion controller 190 outputting a polarity control signal 146 corresponding to one of a first type of inversion and a second type of inversion depending on the result of checking the driving frequency. For example, the frequency checking section 180 and inversion controller 190 can be a processor or circuit, or a part of a processor or circuit.

When the driving frequency is included in the first driving frequency range according to the result of checking the driving frequency, the inversion controller 190 outputs a first polarity control signal 146*a* corresponding to the first type of inversion. When the driving frequency is included in the second driving frequency range, the inversion controller 190 outputs a second polarity control signal 146*b* corresponding to the second type of inversion different from the first type of inversion.

Here, the frequency included in the first driving frequency range can be lower than the frequency included in the second driving frequency range. In a specific frame, the second type of inversion can have a smaller number of polarity alternations than the first type of inversion.

Each of the first type of inversion and the second type of inversion can be one of the above-described inversion types, such as frame inversion, line inversion, column inversion, and dot inversion.

For example, the first type of inversion can be dot inversion including N-dot inversion, such as 1-dot inversion, vertical 2-dot inversion, and horizontal 2-dot inversion. The second type of inversion can be column inversion or Z inversion. Accordingly, the controller 140 can prevent image defects, thereby optimizing superior image quality.

Referring to FIG. 13, a controller 240 may further includes a receiver circuit 270 outputting a clock signal by receiving an external signal and a calculator 170 calculating a driving frequency based on the clock signal.

The calculator 170 calculates the driving frequency corresponding to the clock signal output by the receiver circuit 270.

Although the receiver circuit 270 can be included in the controller 240 as illustrated in FIG. 13, the present disclosure is not limited thereto. The receiver circuit 270 calculates the clock signal based on data, such as main stream attribute (MSA), received from an external system. The process of calculating the clock signal will be described in detail with reference to FIG. 14.

Figure 14:
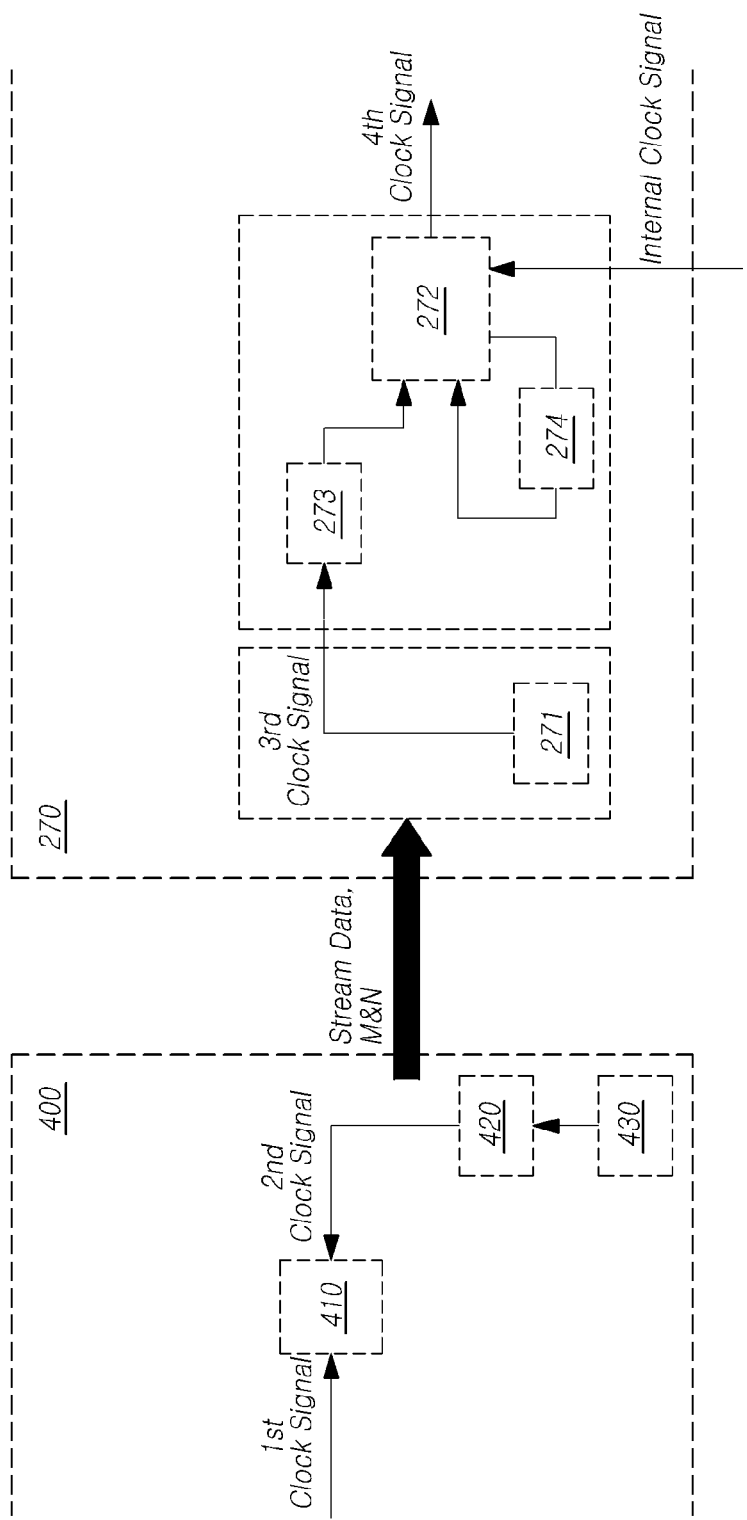
FIG. 14 is a configuration diagram illustrating a process of calculating a clock signal in the receiver circuit according to another embodiment.

FIG. 14 is a configuration diagram illustrating a process of calculating a clock signal in the receiver circuit according to an example embodiment.

Referring to FIG. 14, an external system 400 outputs various data, such as stream data, an M value, an N value, in a variety of manners. The external system 400 includes an M/N counter 410, a first phase-locked loop circuit 420, and a clock generator 430.

The M/N counter 410 receives a first clock signal, receives a second clock signal from the first phase-locked loop circuit 420, and outputs an M value and an N value by an M/N calculation. The first phase-locked loop circuit 420 supplies the second clock signal, generated by the clock generator 430, to the M/N counter 410, by phase-locking.

Here, the first clock signal can be a stream clock signal Strm_CLk, while the second clock signal can be a link clock signal LS_Clk.

The receiver circuit 270 includes a second phase-locked loop circuit 271, a voltage controlled oscillator 272, an N value calculator 273, and an M value calculator 274.

The second phase-locked loop circuit 271 of the receiver circuit 270 receives stream data, the M value, the N value, and the like, and outputs a third clock signal by phase-locking. The third clock signal is subjected to a divide operation with the N value by the N value calculator 273 and then is input to the voltage controlled oscillator 272. The voltage controlled oscillator 272 feeds the third clock signal back to be subjected to a multiplication operation with the M value by the M value calculator 274 and then be sent as an input. The voltage controlled oscillator 272 outputs a fourth clock signal through the above-described calculation process and an internal clock, as well as according to Formula (1):

$$\text{Fourth Clock Signal} = (M/N) * LS\_Clk \qquad (1),$$

where M and N indicate the M value and the N value received from the external system 400, and LS_Clk indicates the third clock signal.

Here, the voltage controller oscillator 272 can further include a phase frequency detector (PFD) generating a signal voltage indicating a phase difference between input signals, a filter correcting a phase depending on the phase difference, and the like. The internal clock can be generated by a crystal present inside or outside of the receiver circuit 270, but the present disclosure is not limited thereto.

The third clock signal can be a clock signal, the type of which is the same as the type of the second clock signal, or can be a link clock signal LS_Clk. The fourth clock signal can be a clock signal, the type of which is the same as the type of the first clock signal, or can be a stream clock signal Strm_CLk. The stream clock signal Strm_CLk can be the same as a dot clock Dclk.

A situation in which image data has a video format of 2560×1440 and 60 Hz will be described by way of example. Here, the first clock signal and the fourth clock signal are stream clock signals, while the second clock signal and the third clock signal are link clock signals. The link clock signals of 270 MHz are output from the phase-locked loop circuit 420, generated by the clock generator 430. The M/N counter 410 of the external system 400 receives a stream clock signal of 241 MHz (e.g., the first clock signal) and a link clock signal of 270 MHz (e.g., the second clock signal) and calculates an M value 29,249 and an N value 32,768. The external system 400 outputs the stream data, the M value, the N value, and the like, generated through the above-described calculation processes, to the receiver circuit 270.

The second phase-locked loop circuit 271 of the receiver circuit 270 reads the stream data and the like, input from the external system 400, and outputs a link clock signal (e.g., the third clock signal) by phase locking. When the M value is 29,249, while an N value is fixed to 32,768, the N value calculator 273 performs a divide operation to the link clock signal (e.g., the third clock signal) using 32,768, calculated by the external system 400. After the divide operation, the link clock signal (e.g., the third clock signal) is input to the voltage controlled oscillator 272. The voltage controlled oscillator 272 feeds the link clock signal (e.g., the third clock signal) back, and the M value calculator 274 performs a multiplication operation to the link clock signal (e.g., the third clock signal) using 29,249, calculated by the external system 400. After the multiplication operation, the link clock signal (e.g., the third clock signal) is sent as an input again. The voltage controlled oscillator 272 calculates outputs a stream clock signal (e.g., the fourth clock signal) using the above-described calculation process and the internal clock, as well as according to Formula (1).

Referring to FIG. 13, the calculator 170 calculates a driving frequency 144 Hz corresponding to the stream clock signal (e.g., the fourth clock signal) 241 MHz.

The receiver circuit 270 according to the further example embodiment makes it possible to calculate a clock signal and a specific driving frequency depending on the operating environment in order to select, or be switched to, a suitable type of inversion, thereby preventing image defects and maintaining superior image quality.

Figure 15:
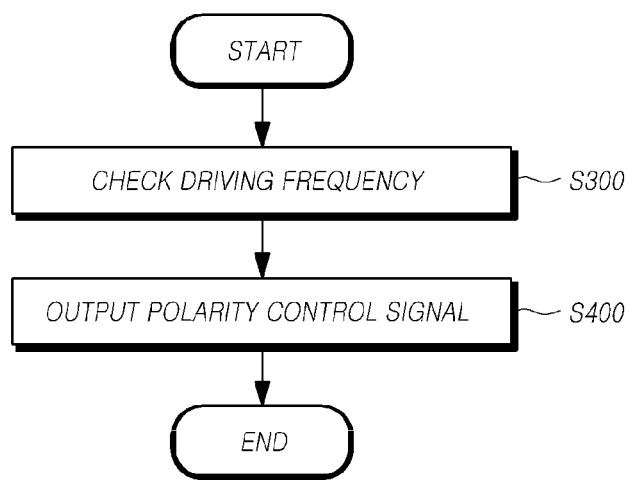
FIG. 15 is a flowchart illustrating a method of driving an LCD device according to another example embodiment.
Figure 16:
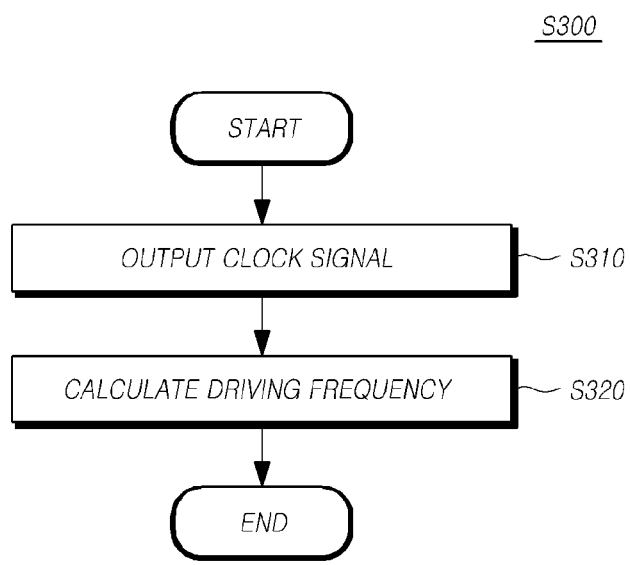
FIG. 16 is a detailed flowchart of the driving frequency checking step in FIG. 15.

FIG. 15 is a flowchart illustrating a method of driving an LCD device according to another example embodiment, and FIG. 16 is a detailed flowchart of the driving frequency checking step in FIG. 15.

Referring to FIG. 15, the method of driving an LCD device according to another example embodiment includes step S300 of checking a driving frequency and step S400 of outputting a polarity control signal corresponding to one of a first type of inversion and a second type of inversion depending on the result of checking the driving frequency.

The step S400 of outputting a polarity control signal can output a first polarity control signal corresponding to the first type of inversion when the driving frequency is included in the first driving frequency range according to the result of checking the driving frequency, and can output a second polarity control signal corresponding to the second type of inversion different from the first type of inversion when the driving frequency is included in the second driving frequency range.

Here, the frequency included in the first driving frequency range can be lower than the frequency included in the second driving frequency range. In a specific frame, the second type of inversion can have a smaller number of polarity alternations than the first type of inversion.

Each of the first type of inversion and the second type of inversion can be one of the above-described inversion types, such as frame inversion, line inversion, column inversion, and dot inversion.

For example, the first type of inversion can be dot inversion including N-dot inversion, such as 1-dot inversion, vertical 2-dot inversion, and horizontal 2-dot inversion. The second type of inversion can be column inversion or Z inversion.

Referring to FIG. 16, the step S300 of checking a driving frequency can include step S310 of outputting a clock signal by receiving an external input signal and step S320 of calculating the driving frequency based on the clock signal.

That is, the clock signal, e.g., a dot clock DClk, is calculated and output in the step S310 of outputting the clock signal by receiving restoration information or the like from an external system, and the driving frequency calculated in the step S320 of calculating the driving frequency based on the clock signal is checked.

As set forth above, when the LCD device, the controller thereof, and the driving method thereof according to example embodiments are applied, it is possible to select, or be switched to, a type of inversion suitable for a specific driving frequency depending on the driving environment, thereby preventing image defects and maintaining high image quality.

The foregoing descriptions and the accompanying drawings have been presented in order to explain the certain principles of the present disclosure. A person skilled in the art to which the present disclosure relates could make various modifications and variations by combining, dividing, substituting for, or changing the elements without departing from the principle of the present disclosure. The foregoing embodiments disclosed herein shall be interpreted as being illustrative, while not being limitative, of the principle and scope of the present disclosure. It should be understood that the scope of the present disclosure shall be defined by the appended Claims and all of their equivalents fall within the scope of the present disclosure.

What is claimed is:

1. A liquid crystal display device comprising:
   a liquid crystal display panel configured to display images, on which a plurality of data lines and a plurality of gate lines are disposed, and a plurality of subpixels defined by the plurality of data lines and the plurality of gate lines are arranged;
   a gate driver configured to supply a scanning signal to the plurality of gate lines;

a data driver configured to supply a data voltage to the plurality of data lines; and a controller configured to control the gate driver and the data driver, wherein the liquid crystal display device operates in a first type of inversion when a driving frequency is in a first driving frequency range, and the liquid crystal display device operates in a second type of inversion different from the first type of inversion when the driving frequency is in a second driving frequency range different from the first driving frequency range, and wherein the controller further comprises:

a receiver configured to output a clock signal based on an external signal;

a calculator configured to calculate the driving frequency based on the clock signal;

a frequency checker configured to check the driving frequency; and an inversion controller configured to:

output a first polarity control signal corresponding to the first type of inversion when the driving frequency is included in the first driving frequency range based on a result of checking the driving frequency, and output a second polarity control signal corresponding to the second type of inversion when the driving frequency is included in the second driving frequency range based on a result of checking the driving frequency.

2. The liquid crystal display device according to claim 1, wherein the controller is further configured to:

output a first data control signal corresponding to the first type of inversion when the driving frequency is included in the first driving frequency range, and output a second data control signal corresponding to the second type of inversion different from the first type of inversion when the driving frequency is included in the second driving frequency range.

3. The liquid crystal display device according to claim 1, wherein the driving frequency included in the first driving frequency range is lower than the driving frequency included in the second driving frequency range, and wherein the second type of inversion has a number of polarity alternations that is less than a number of polarity alternations in the first type of inversion in a specific frame.

4. The liquid crystal display device according to claim 3, wherein the first type of inversion includes dot inversion, and the second type of inversion includes column inversion or Z inversion.

5. The liquid crystal display device according to claim 1, wherein the controller is further configured to:

in response to the driving frequency of the liquid crystal display device transitioning from the second driving frequency range into the first driving frequency range, output the first polarity signal, and in response to a driving frequency of the liquid crystal display device transitioning from the first driving frequency range into the second driving frequency range, output the second polarity signal.

6. The liquid crystal display device according to claim 1, wherein the first driving frequency range is for a low speed driving environment including a still image mode or a video mode, and the second driving frequency range is for a high speed driving environment including a video game mode.

7. The liquid crystal display device according to claim 1, wherein the first driving frequency range is from 48 Hz to 120 Hz, and the second driving frequency range is from 120 Hz to 144 Hz.

8. A controller for a display device, the controller comprising:

a receiver configured to output a clock signal based on an external signal and an internal signal;

a calculator configured to calculate the driving frequency based on the clock signal;

a frequency checker configured to check a driving frequency; and an inversion controller configured to:

output a first polarity control signal corresponding to a first type of inversion when the driving frequency is included in a first driving frequency range based on a result of checking the driving frequency, and output a second polarity control signal corresponding to a second type of inversion when the driving frequency is included in a second driving frequency range different from the first driving frequency range based on a result of checking the driving frequency.

9. The controller according to claim 8, wherein the driving frequency included in the first driving frequency range is lower than the driving frequency included in the second driving frequency range, and wherein the second type of inversion has a number of polarity alternations that is less than a number of polarity alternations in the first type of inversion in a specific frame.

10. The controller according to claim 9, wherein the first type of inversion includes dot inversion, and the second type of inversion includes column inversion or Z inversion.

11. The controller according to claim 8, wherein an M value is a counter value corresponding to the external signal and an N value is a counter value corresponding to the internal signal, where M and N are positive integers, and wherein the clock signal is calculated by a formula:

frequency of the clock signal=$(M/N)$*LS_Clk, where LS_Clk is the internal signal.

12. The controller according to claim 11, wherein the external signal is a stream clock signal.

13. The controller according to claim 11, wherein the internal signal is a link clock signal.

14. A method of driving a liquid crystal display device, the method comprising:

checking a driving frequency;

according to a result of the checking of the driving frequency, outputting a first polarity control signal corresponding to a first type of inversion when the driving frequency is in a first driving frequency range and outputting a second polarity control signal corresponding to a second type of inversion different from the first type of inversion when the driving frequency is in a second driving frequency range, wherein the checking of the driving frequency includes outputting a clock signal by receiving an external signal and an internal signal, and calculating the driving frequency based on the clock signal, wherein an M value is a counter value corresponding to the external signal and an N value is a counter value corresponding to the internal signal, where M and N are positive integers, and wherein the clock signal is calculated by a formula:

frequency of the clock signal=$(M/N)$*LS_Clk, where LS_Clk is the internal signal.

15. The method of driving the liquid crystal display device according to claim 14, wherein the driving frequency included in the first driving frequency range is lower than the driving frequency included in the second driving frequency range, and wherein the second type of inversion has a number of polarity alternations that is less than a number of polarity alternations in the first type of inversion in a specific frame.

16. The method of driving the liquid crystal display device according to claim 15, wherein the first type of inversion includes dot inversion, and the second type of inversion includes column inversion or Z inversion.

17. The method of driving the liquid crystal display device according to claim 14, wherein the checking of the driving frequency is performed by a controller; and a result of the checking of the driving frequency is output to a data driver.

* * * * *